United States Patent
Watanabe (10) Patent No.: US 7,286,733 B2
(45) Date of Patent: Oct. 23, 2007

(54) LIGHT GUIDE BODY

(75) Inventor: Seiichi Watanabe, Odawara (JP)

(73) Assignee: Fujifilm Corporation, Tokyo (JP)

(*) Notice: Subject to any disclaimer, the term of this patent is extended or adjusted under 35 U.S.C. 154(b) by 0 days.

(21) Appl. No.: 11/169,692

(22) Filed: Jun. 30, 2005

(65) Prior Publication Data
US 2006/0002658 A1    Jan. 5, 2006

(30) Foreign Application Priority Data
Jun. 30, 2004   (JP)   .............. 2004-193135

(51) Int. Cl.
G02B 6/26  (2006.01)
(52) U.S. Cl. .............. 385/43; 385/45; 385/50
(58) Field of Classification Search .......... 385/43, 385/50, 129
See application file for complete search history.

(56) References Cited

U.S. PATENT DOCUMENTS

| | | | | |
|---|---|---|---|---|
| 5,881,201 A * | 3/1999 | Khanarian | ............... | 385/146 |
| 6,385,371 B1 * | 5/2002 | Li | ............... | 385/43 |
| 6,697,552 B2 * | 2/2004 | McGreer et al. | ............... | 385/37 |
| 6,836,600 B2 * | 12/2004 | Doerr | ............... | 385/46 |
| 7,031,579 B2 * | 4/2006 | Sisodia et al. | ............... | 385/120 |
| 2005/0100282 A1 * | 5/2005 | Okada et al. | ............... | 385/46 |
| 2006/0002679 A1 * | 1/2006 | Watanabe | ............... | 385/147 |
| 2006/0024019 A1 * | 2/2006 | Watanabe | ............... | 385/147 |
| 2006/0133713 A1 * | 6/2006 | Yamada et al. | ............... | 385/5 |

FOREIGN PATENT DOCUMENTS

| JP | 10-123350 A | 5/1998 |
|---|---|---|
| JP | 11-31035 A | 2/1999 |

* cited by examiner

*Primary Examiner*—Michelle Connelly-Cushwa
*Assistant Examiner*—Rhonda S. Peace
(74) *Attorney, Agent, or Firm*—Sughrue Mion, PLLC (57) ABSTRACT

A light guide body includes: at least a front end tapered portion including one end connectable to an optical fiber and the other end, the one end being thinner than the other end; a plurality of second taper portions, each including one end connectable to an optical fiber and the other end, the one end of the second taper portion being thinner than the other end of the second taper portion; and a main body connected to the other ends of the first and second taper portions. The front end tapered portion, the main body, and the second taper portions provide transmission of incident light with division between the one end of the front end tapered portion and the one ends of the second taper portions.

38 Claims, 10 Drawing Sheets

LIGHT GUIDE BODY

BACKGROUND OF THE INVENTION

1. Field of the Invention

The present invention relates to a light guide body for providing optical transmission between one end thereof to the other end thereof and particularly relates to a light guide body for providing optical transmission with division between one end thereof having one optical port and the other end thereof having at least one optical port.

2. Description of the Related Art

Light guide bodies are known that provide optical transmission between one end thereof and other end thereof. Further, optical seat buses as the light guide bodies (light guide) are known that receive light at one end and emitting the light at a plurality of end faces (optical ports) at the other end. Japanese laid-open patent application No. 11-31035 discloses an optical bus in which a material such as Polymethyl methacrylate (PMMA) is molded in a layer having input and output optical ports and a dividing section.

SUMMARY OF THE INVENTION

An aspect of the present invention provides a light guide body comprising at least a first taper portion including one end with an end face connectable to an optical fiber and the other end, the one end being thinner than the other end; a plurality of second taper portions, each including one end with an end face connectable to an optical fiber and the other end, the one end of the second taper portion being thinner than the other end of the second taper portion; and a main body connected to the other ends of the first and second taper portions. The first taper portion, the light guide body, and the second taper portions may provide transmission of incident light with division between the one end of the first taper portion and the one ends of the second taper portions.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 10A:
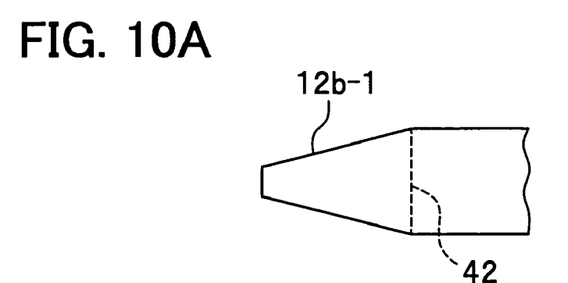
FIGS. 10A to 10C are partial plan views of the front end tapered portion according to modification of the present invention.
Figure 10B:
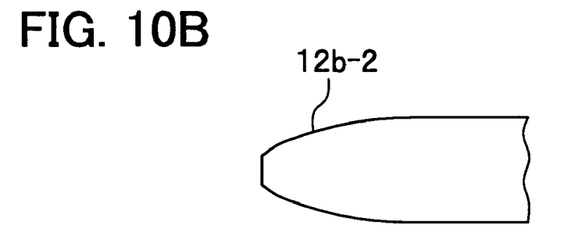
Figure 10C:
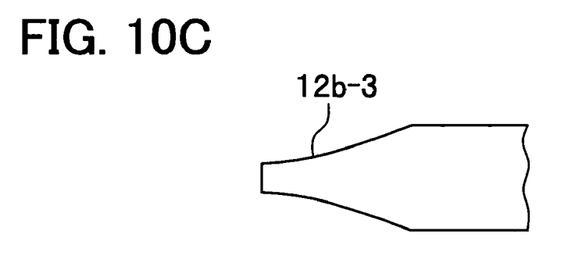
Figure 12A:
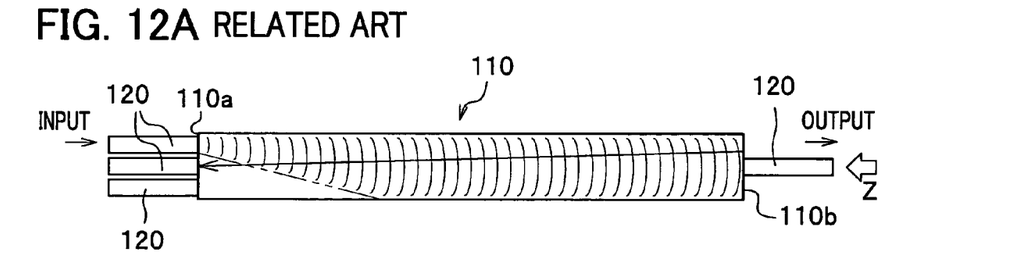
FIG. 12A is a plan view illustrating light transmission incident from one of the end faces of a related art optical sheet bus.
Figure 12B:
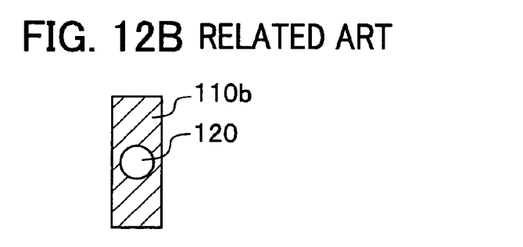
FIG. 12B is a rear view, viewed from the Z direction shown in FIG. 12A, illustrating light transmission of a related art optical sheet bus.
Figure 12C:
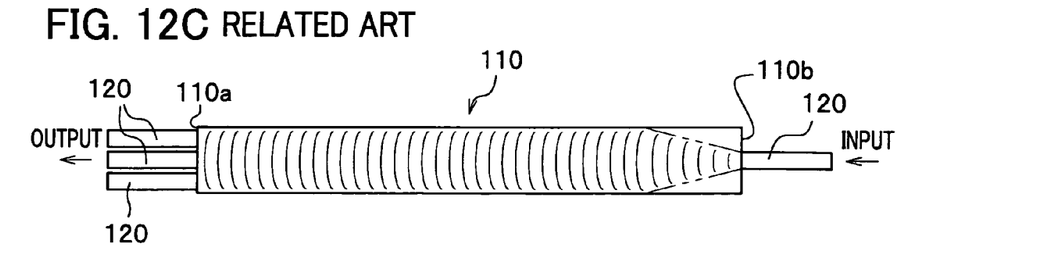
FIG. 12C is a sectional view illustrating light transmission incident from a single end face of the related art optical sheet bus.

Prior to describing an embodiment of an optical sheet bus 10 according to the present invention, a course of studying the optical sheet bus will be described. Experience with a related art optical bus shown in FIGS. 12A, 12B, and 12C shows that a light transmission efficiency is low. The related art optical bus 110 is molded to have a rectangular column having an end face 110a to which optical fibers 120 are connected and the other end face 110b to which the optical fiber 120 is connected. When one of the optical fibers 120 connected to the end face 110a applies light, the incident light spreadingly travels through the optical bus 110. A portion of the transmitted light can enter the optical fiber 120 connected to the end face 110b. However, a large part of the transmitted light is transmitted through and reflected by a wall of the end face 110b of the optical bus 110 as useless light. Thus, the transmission efficiency is relatively low. When light is incident at the end face 110b as shown in FIG. 10C, similarly a large part of the incident light is transmitted through and reflected by a wall at the end face 110a. As a result, the transmission efficiency is relatively low.

Hereinafter, an embodiment of the optical sheet bus 10 according to the present invention will be described with reference to FIG. 1, and FIGS. 2A to 2D.

The optical sheet bus 10 according to the embodiment of the present invention is provided for improving the light transmission efficiency.

Figure 1:
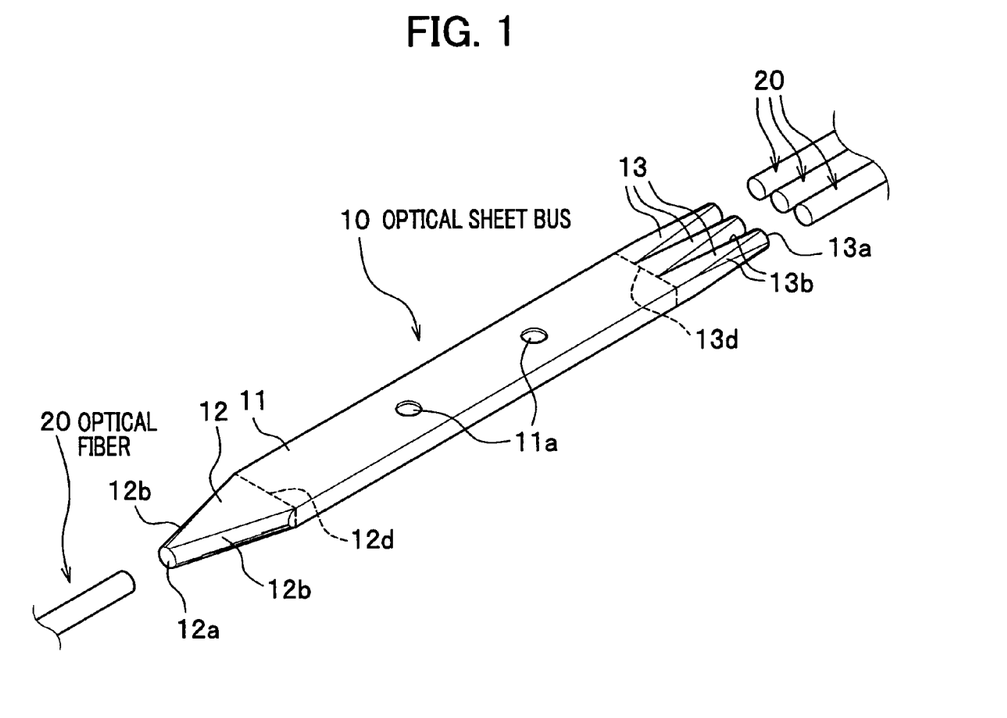
FIG. 1 is a perspective view of an optical sheet bus according to an embodiment of the present invention.
Figures 2A, 2B:
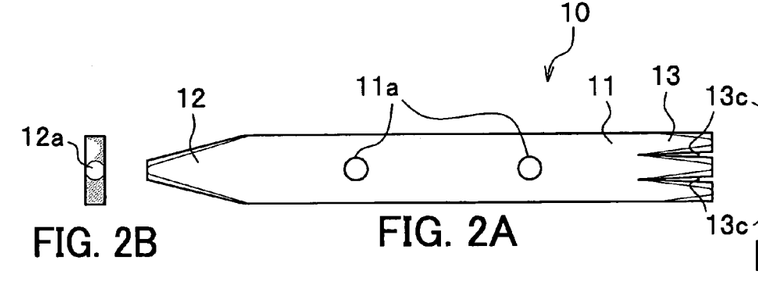
FIGS. 2A, 2B, 2C, and 2D are a plan view, a front view, a rear view, and a side view of the optical sheet bus shown in FIG. 1, respectively.

The optical sheet bus (light guide body) 10 is formed, as shown in FIGS. 1 and 2A to 2D, in a substantially thin rectangular parallelepiped (sheet) extending a direction (longitudinal direction thereof), in which a cross-section of the optical sheet bus is a rectangular as shown in FIG. 2B. One end of the optical sheet bus 10 has an end face (optical port) 12a, having a circular surface, which is connectable to an optical fiber 20. The other end of the optical sheet bus 10 has three end faces 13a which are connectable to optical fibers 20. The one and the other ends of the optical sheet bus 10 may be also referred to as front end and rear ends throughout the specification, respectively.

The optical sheet bus 10 comprises at least a front end tapered portion (first taper portion) 12, a main body 11 connected to the front end tapered portion 12 for guiding light; and a plurality of rear end tapered portions 13 connected to the main body 11, wherein the front end tapered portion 12, the main body 11, and the rear end tapered portions 13 are unitedly molded. The front end tapered portion 12, the main body 11, and the rear end tapered portions 13 provide transmission of incident light with reflection between the front end tapered portion 12 and the rear end tapered portions 13 with division when the light is incident from the front end tapered portion 12 and without division when the light is incident from the rear end tapered portion 13. When a plurality of optical fibers 20 are connected to the rear end portions 13 at the same time, incident light beams are mixed.

In an upper surface (in FIG. 1) of the main body 11, are formed two pin impressions 11a because shapes of tips of the ejector pins 33a and 34a are printed on the upper surface of the main body 11. Molding is performed in which depth of the pin impressions 11a, i.e., a height of step, is not greater than 10 μm. Further, the optical sheet bus 10 has a surface roughness Ra not greater than 1.0 μm.

The front end tapered portion 12 extends from the main body 11 in the longitudinal direction of the main body 11 and has two slant surfaces 12b to have the end face having a diameter which is approximately the same as that of the optical fiber 20. The slant surfaces 12b makes an angle projected on a horizontal plane which is approximately the same as that made while light that is emitted at a facet of the optical fiber 20 and enters the materials of the front end tapered portion 12 expands. In other words, consider an optical sheet bus having a rectangular end (in plan view), and the front end tapered portion 12 is made such that both corners of the optical sheet bus having the rectangular end are cut, in which the cut portions do not transmit light from the light guide fiber 20, which cut portions are useless. The angle made between the taper surfaces 12b (taper angle α shown in FIG. 9B) is preferably, from 3° to 30°.

The rear end tapered portions 13 connected to the main body 11 in the longitudinal direction of the main body 11 are formed to have three end tapered portions 13 for three optical fibers 20, respectively. In other words, the rear end tapered portions 13 are formed such that an optical sheet bus having a rectangular end is divided into three portions which are tapered, respectively, to have each circular end face 13a with a diameter which is approximately the same as that of the optical fiber 20. The second slant surfaces 13b makes an angle projected on the horizontal plane, which is smaller than that made while light that is emitted at a facet of the optical fiber 20 and enters the materials of the rear end tapered portion 13 expands. The taper angle made by the two slant surfaces 13b is preferably from 3° to 30°.

Figure 2C:
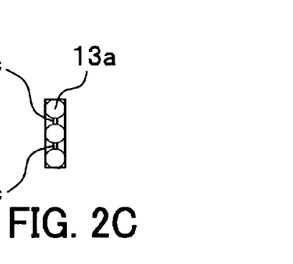

The rear end tapered portions 13 may be reinforced with reinforcing members (plates) 13c for connecting two neighboring rear end tapered portions 13 (see FIGS. 2A and 2C).

For example, PMMA (Polymethyl methacrylate) is used as a material of the optical sheet bus 10. However, the optical sheet bus 10 may be formed such that light-scattering bodies (particles) 41 (see FIG. 10D) is diffused in the PMMA to scatter light in the optical sheet bus 10. This is disclosed in Japanese laid-open patent publication No. 10-12350. The scattering effect by the light-scattering bodies 41 shorten the longitudinal length necessary for the optical sheet bus 10, particularly for dividing light, in the light propagation direction (longitudinal direction) shown in FIGS. 9A and 9B. As such a light-scattering body, for example, polystyrene (PS) having a refractive index which is different from the PMMA can be used.

The injection mold 30 for producing the optical sheet bus 10 will be described with reference to FIG. 3.

The injection mold 30 comprises a fixed mold 31, a movable mold 32 movable relative to the fixed mold 31, an ejector mechanism 33, on the side of the fixed mold 31, arranged within the fixed mold 31 and an ejector mechanism 34, on the side of the movable mold, arranged within the movable mold 32.

Figures 4A, 4B:
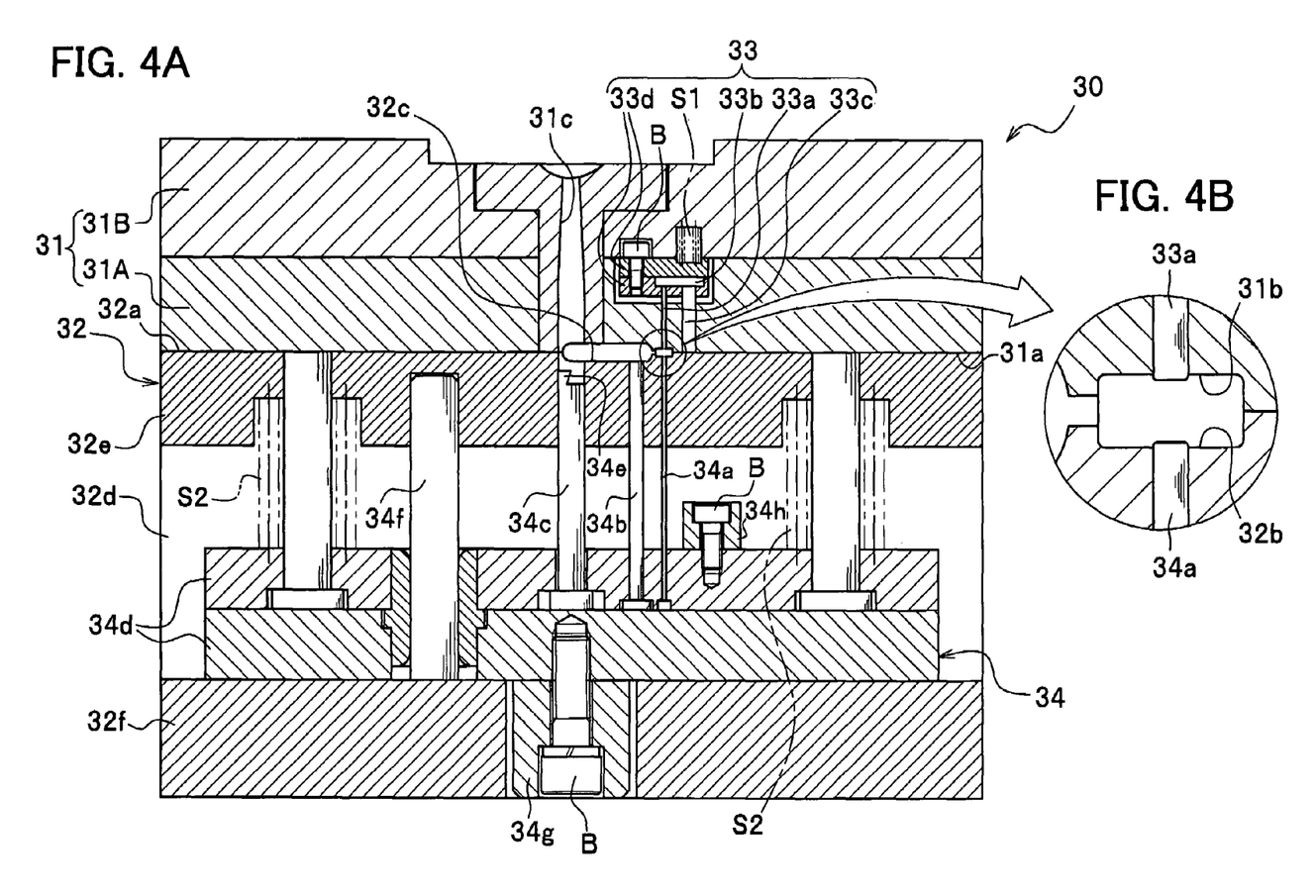
FIG. 4A is a sectional view of the injection mold shown in FIG. 3.
FIG. 4B is an enlarged view of a portion shown in FIG. 4A.

Mating surfaces 31a and 32a between the fixed mold 31 and the movable mold 32 have, as shown in FIG. 4B, a shaping recesses 31b and 32b having shapes of the upper half and the lower half of the optical sheet bus 10, respectively. An upper surface of the fixed mold 31 has a sprue 31c therein for introducing melted plastic (melting material) injected from an injection apparatus into a runner formed portion 32c which is formed at the mating surfaces 31a and 32a to provide communication between the runner formed portion 32c and the sprue 31c (see sprue 31c in FIG. 4A).

The ejector mechanism 33 comprises, as shown in FIG. 4A, two ejector pins 33a (only this side is shown) and a synchronizing pin 33c, two retainer plates 33d fastened using a bolt B with a mounting plate 33b sandwiched by the retainer plates 33d in the vertical direction, and a spring S1 continuously energizing the retainer plate 33d to the side of the movable mold 32.

Figure 5:
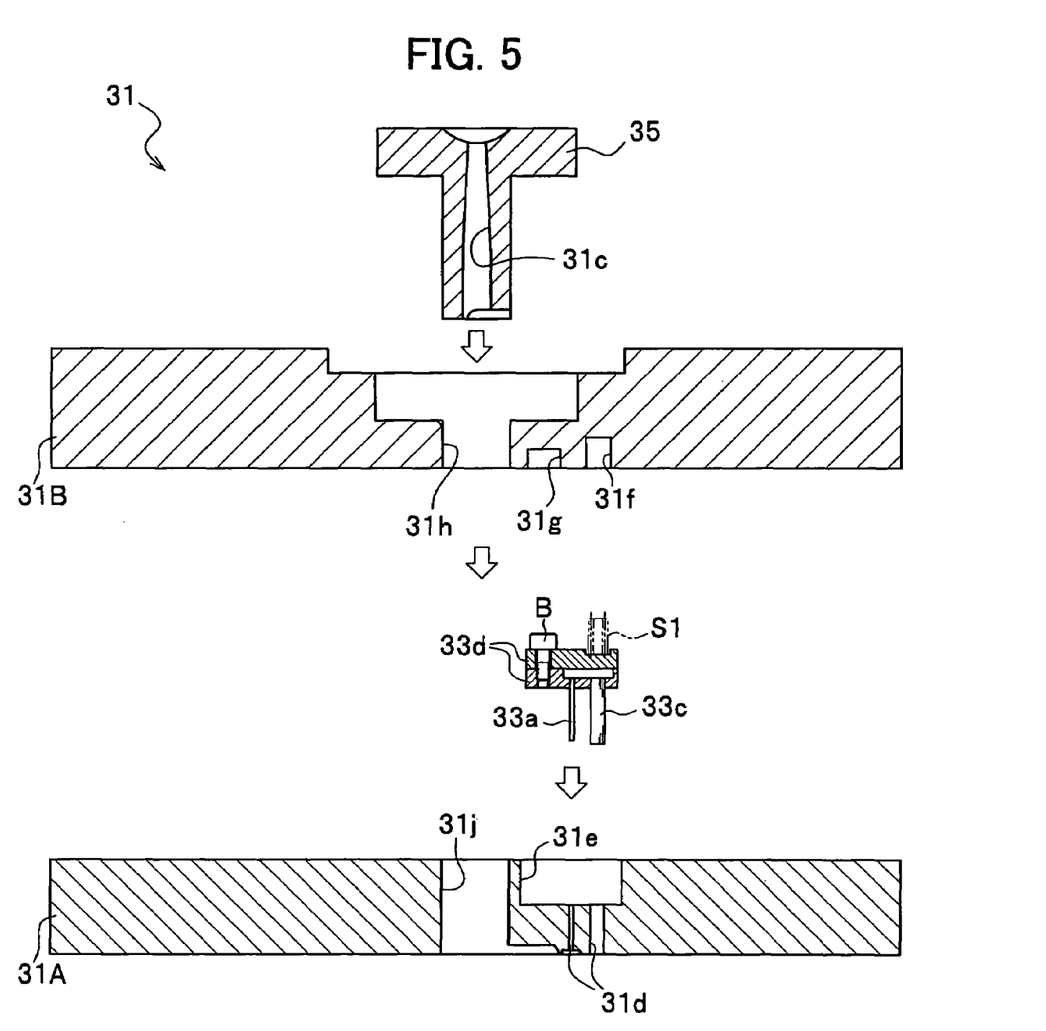
FIG. 5 is a sectional view of an ejector mechanism on the fixed mold shown in FIG. 4A in a disassembled status.

The fixed mold 31 can be, as shown in FIG. 5, vertically disassembled. The lower part, i.e., a lower fixed mold 31A, has receiving holes 31d for slidably receiving the ejector pin 33a and the synchronizing pin 33c and a accommodating recess portion 31e for slidably holding the two retainer plates 33d fastened with the bolt B. In the upper fixed mold 31B which is the upper half of the fixed mold 31 has a retainer recess 31f for holding the spring S1 in a compressed condition, and an escape hole 31g for containing a head of the bolt B. A distance of the stroke of the retainer plate 33d is determined by a bottom surface of the accommodating recess portion 31e of the lower fixed mold 31A and the lower surface of the upper fixed mold 31B. Further, the upper fixed mold 31B and the lower fixed mold 31A have receiving holes 31h and 31j for mounting a sprue bush 35 in which the sprue 31c is formed.

Figure 6:
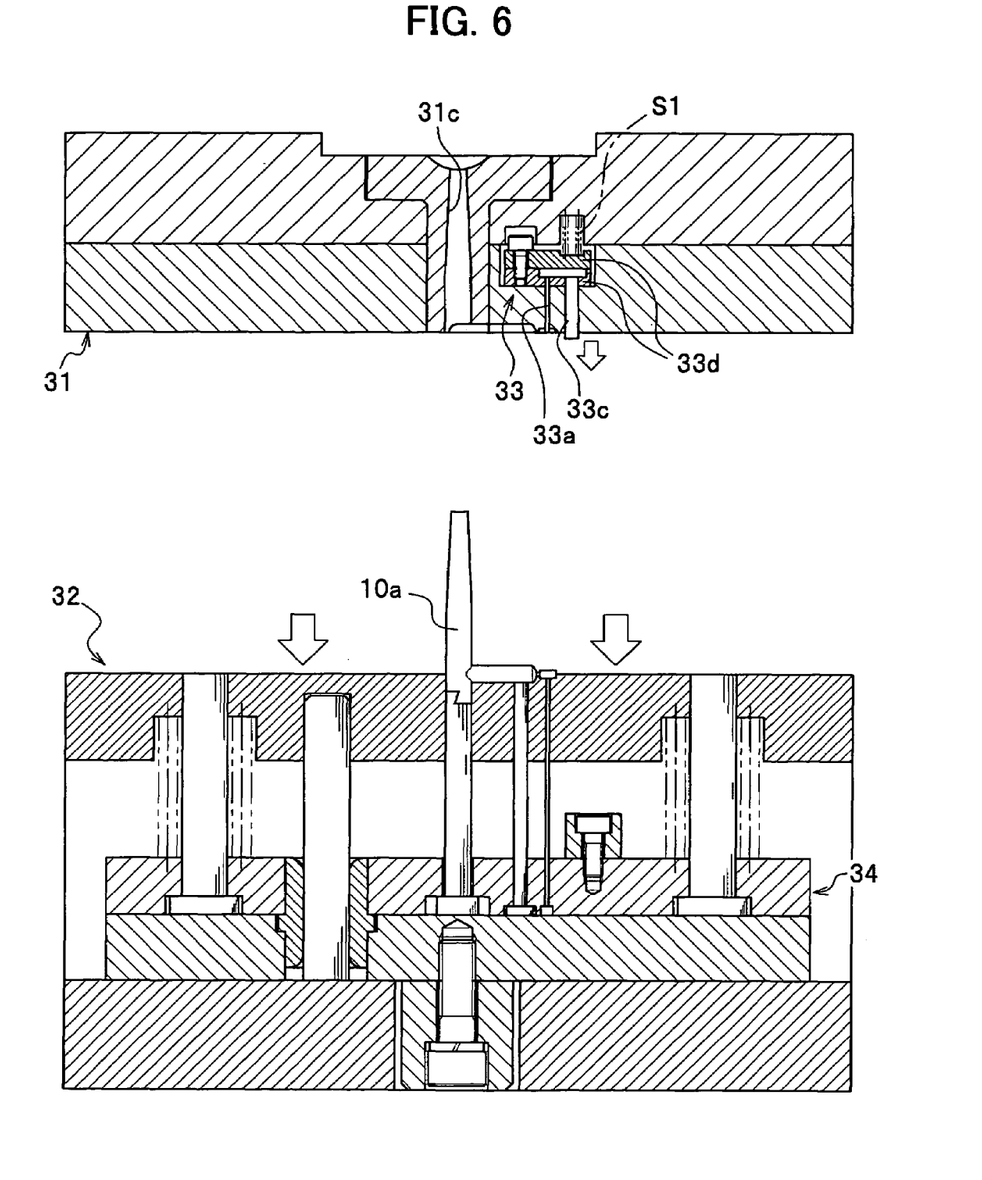
FIG. 6 illustrates the injection mold in which the movable mold is released from the fixed mole after molding the optical sheet bus, according to the embodiment of the present invention.

The ejector mechanism 33 on the side of the fixed mold 31 configured as mentioned above protrudes the ejector pin 33a and the synchronizing pin 33c by a predetermined distance as a result of pushing the retainer plate 33d downward by the spring S1 in the condition that the movable mold 32 is positioned apart from the fixed mold 31 as shown in FIG. 6.

Further, as shown in FIGS. 4A and 4B, when the fixed mold 31 is contact with the movable mold 32, a tip of the synchronizing pin 33c is flush (contact) with the mating surface 32a of the movable mold 32 because the synchronizing pin 33c is pushed by the mating surface of the movable mold 32, in which the spring S1 is compressed as well as a tip of the ejector pin 33a moves to a position substantially mating with a molding surface of a shaping recess 31b, wherein the tip of the ejector pin 33a downwardly (in FIG. 6) protrudes by a distance of 10 μm at the maximum. In other words, the ejector pin 33a and the synchronizing pin 33c slidably protrudes from the molding surface of the shaping recess 31b and the mating surface 31a within the stroke of the retainer plates 33d.

As shown in FIG. 4A, the ejector mechanism 34 on the side of the movable side comprises two ejector pins 34a (only this side is shown), two pushing pins 34b to push the a runner 10a (see FIG. 3), two retainer plates 34d integrally holding these ejector pines 34a and pushing pins 34b and 34c. Further, at a tip of the pushing pin 34c under the sprue 31c, is formed an engagement claw portion 34e for hooking the runner 10a as the movable mold 32 moves. More concretely and the engagement claw portion 34e includes an overhung configuration which hooks the runner 10a.

The ejector mechanism 34 on the side of the movable side comprises a guide bar 34f fixed to the movable mold 32 for slidably supporting the retainer plates 34d and a spring S2 always actuating the retainer plates 34d in a direction apart from the side of the fixed mold 31. At a substantially middle of the retainer plate 34d on the lower side out of the two retainer plates 34d, is fastened a protrusion portion 34g for pushing with the bolt B. At a suitable place of a surface of the upper retainer plate 34d is fixed, with a bolt B, a stopper 34h for limiting the upper movement of the retainer plate 34d more than a predetermined distance.

Furthermore, the movable mold 32 further comprises a molding plate 32e and a mounting plate 32f on the movable side which are connected with a spacer block 32d shown in the depth direction of the FIG. 4A. The molding plate 32e, the mounting plate 32f on the movable side, a lower surface of the retainer plate 34d, and an upper surface of the stopper 34h corresponds a protrusion distances of the ejector pins 34a and the pushing pins 34b and 34c.

A method of producing the optical sheet bus 10 with the injection mold 30 according to the embodiment will be described.

First, the fixed mold 31 is brought in contact with the movable mold 32 and then, a nozzle of an injection apparatus (not shown) is connected to the upper portion of the sprue 31c of the fixed mold 31.

Figure 7A:
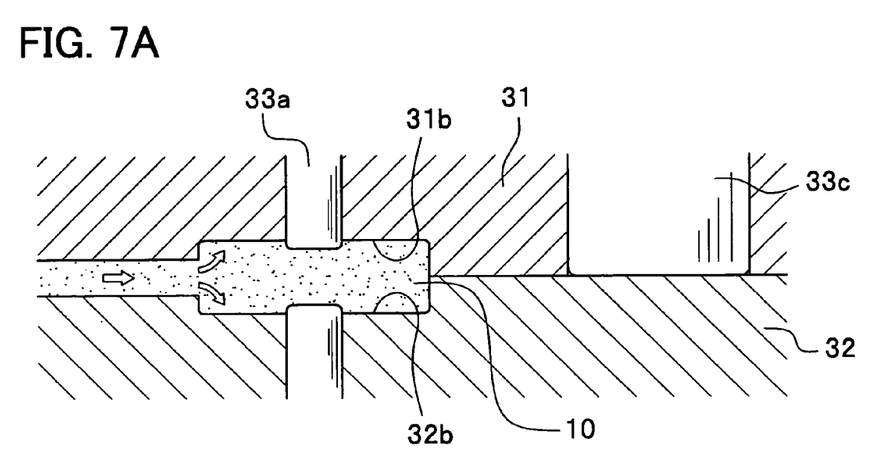
FIG. 7A illustrates shaping recesses filled with melting plastic according to the embodiment of the present invention.

When a melting plastic is injected from the injection apparatus into the sprue 31c, the melting plastic is supplied, as shown in FIG. 7A, through the sprue 31c and the runner formed portion 32c to a cavity provided with the shaping recesses 31b and 32b.

Figure 7B:
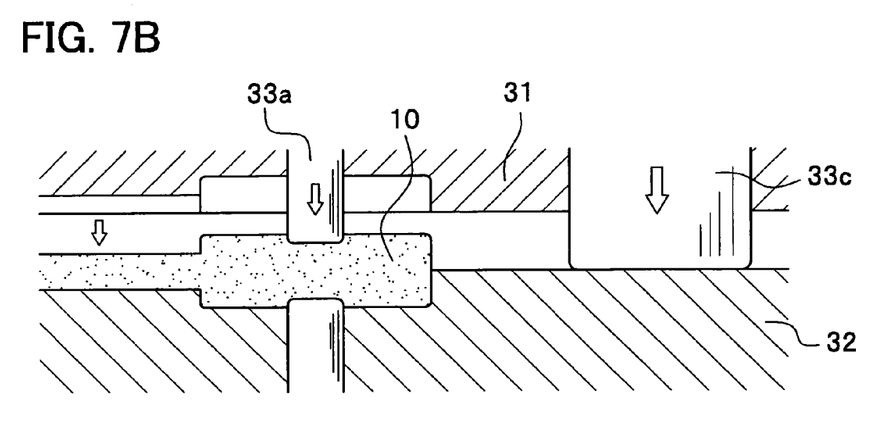
FIG. 7B illustrates the shaping recesses while the movable mold is detached from the fixed mold according to the embodiment of the present invention.

After injection of the melting plastic into the shaping recesses 31b and 32b, cooling the injection mold 30 forms the optical sheet bus 10 by solidification. Next, to remove the optical sheet bus 10 from the injection mold 30, the movable mold 32 is parted and moved from the fixed mold 31. Then, as shown in FIG. 7B, the synchronizing pin 33c in contact with the movable mold 32 downwardly moves as the movable mold 32 moves, which moves the ejector pin 33a at a moving velocity which is equal to that of the synchronizing pin 33c and the movable mold 32 to push the optical sheet bus 10 toward the side of the movable mold 32. In other words, the optical sheet bus 10 moves with the movable mold 32, namely, the optical sheet bus is retained in the movable mold 32. This surely pushes the optical sheet bus 10 toward the side of the movable mold 32 on opening the molds.

On opening the molds, since the runner 10a is hooked, as shown in FIG. 4A, by the engagement claw portion 34e formed by the pushing pin 34c on the side of the movable mold 32 to move together with the movable mold 32, which surely pushes the optical sheet bus 10 toward the side of the movable mold in a well-balanced manner.

Figure 8:
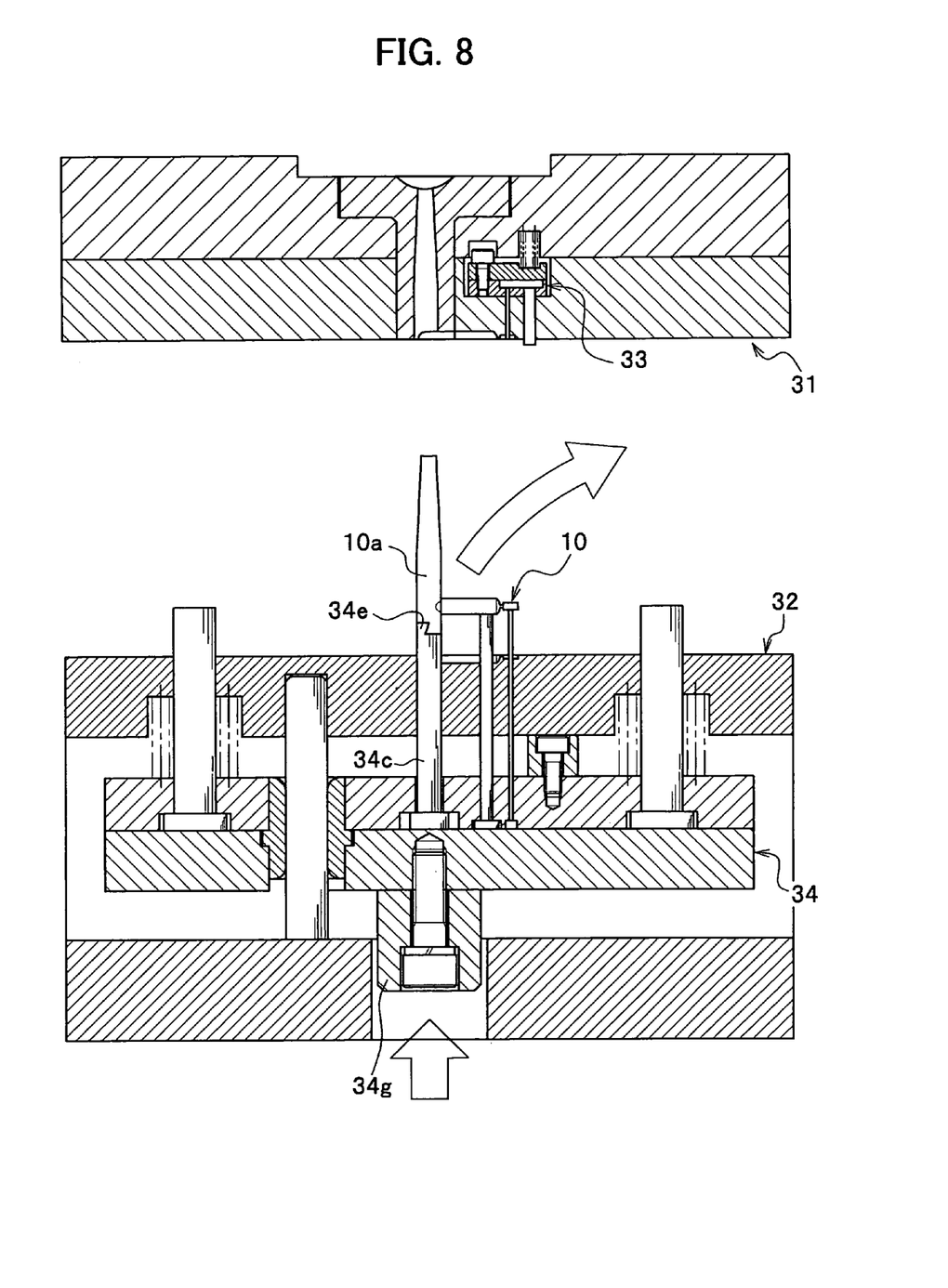
FIG. 8 illustrates the optical sheet bus removed from the molds by the ejector mechanism according to the embodiment of the present invention.

Next, as shown in FIG. 6, the movable mold 32 is downwardly moved until an upper end of the runner 10a that is formed in the sprue 31c is removed from the fixed mold 31. After that, when the protrusion portion 34g is upwardly pushed by a pressurizing apparatus, the optical sheet bus 10 and the runner 10a are externally removed from the movable mold 32. Further, the optical sheet bus 10 and the runner 10a can be taken out along the slope of the engagement claw portion 34e of the ejector pin 34c as shown in FIG. 8.

Figure 3:
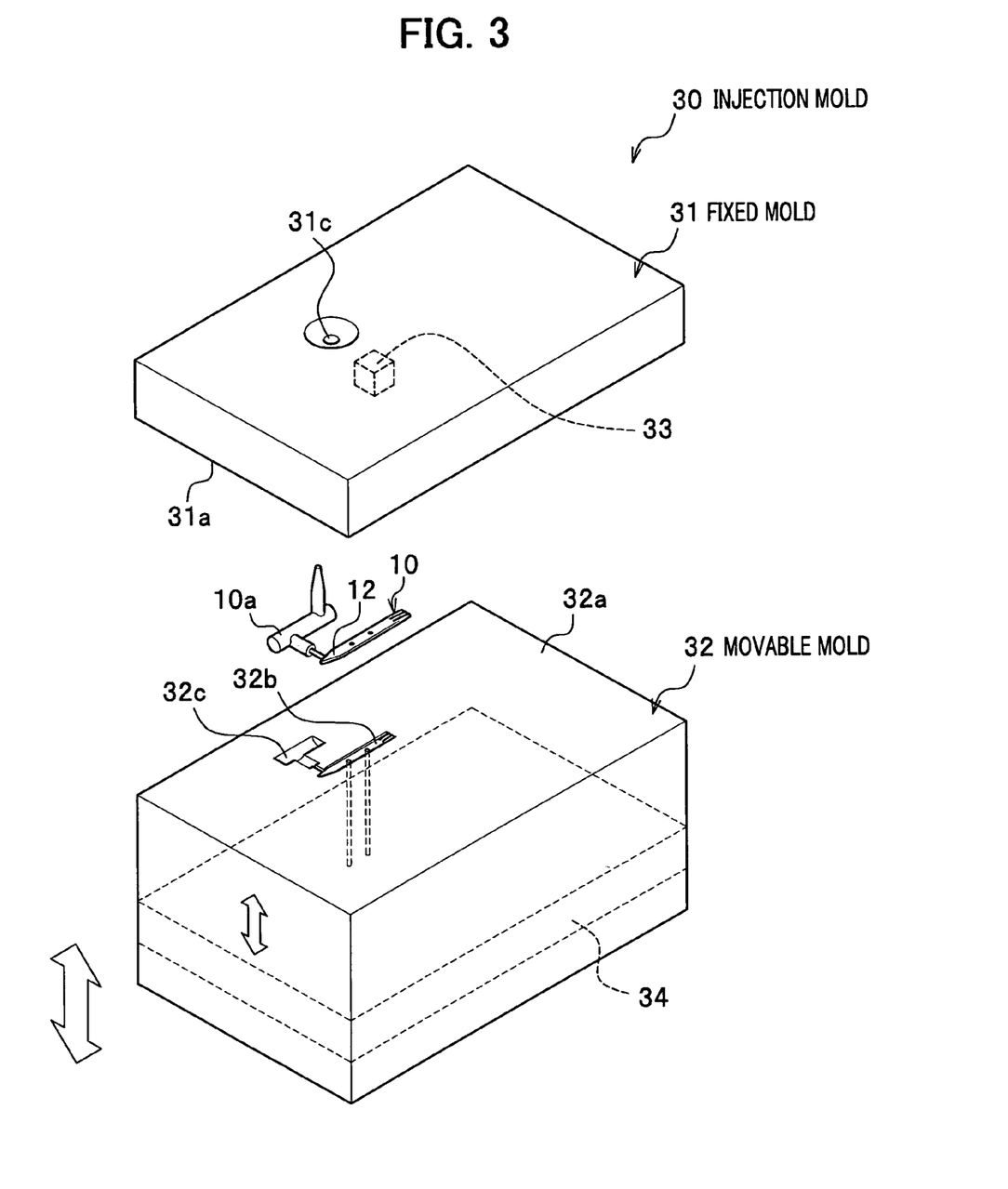
FIG. 3 is a perspective view of an injection mold for molding the optical sheet bus according to the embodiment of the present invention.

To the front end tapered portion 12 is connected the runner 10a when the optical sheet bus 10 is removed from the injection mold 30 as shown in FIG. 3. Thus, first, the runner 10a is removed from the optical sheet bus 10, for example, with a nipper. In this operation, a portion left on the optical sheet bus 10 is cut until the portion is flushed with the slant surface 12b of the front end tapered portion 12 by grinding process (see FIG. 1) with a cutter and a grindstone. After grinding, the grinded portion is formed to have a height of steps not greater than 10 μm and the surface roughness not greater than 1.0 μm.

Similarly, the height of step provided by the pin impression 11a formed on the both sides of the optical sheet bus 10 is preferably, not greater than 10 μm and the surface roughness not greater than 1.0 μm, which is provided by smoothly forming the surfaces of the mold hollow portions 31b and 32b of the molds 31 and 32 with decreasing the height of steps between the tip of the ejector pin 33a and the surface of the shaping recess 31b and between the tip of the ejector pin 34a and the surface of the shaping recess 32b.

Operation of the optical sheet bus 10 will be described.

Figure 9A:
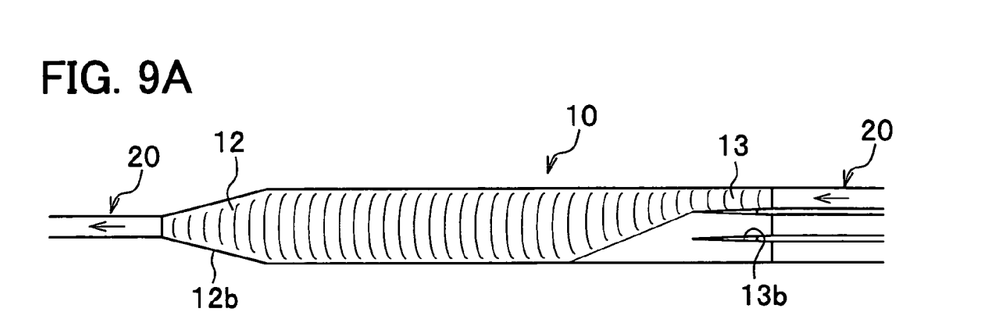
FIG. 9A is a sectional view illustrating light transmission incident from a rear end taper portion of the optical sheet bus according to the present invention.

As shown in FIG. 9A, when a light beam is incident to the optical sheet bus 10 from one of the optical fiber 20 shown in the right of the drawing in FIG. 9A, the light beam travels to the left of the drawing with its beam width being expanded. When the light beam reaches the front end tapered portion 12, a potion of light beam expanding hits the walls of the taper portion 12 (slant surfaces 12b) which reflects the portion of the light beam inwardly by reflection. Since the wall is tapered, the reflected light beam is collected and condensed at the end face 12a, which increases brightness of light incident to the light guide fiber 20 at the left of the drawing.

Figure 9B:
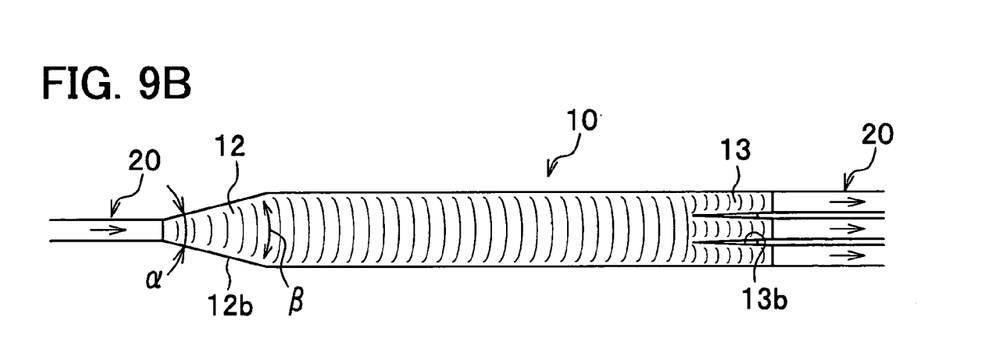
FIG. 9B is a sectional view illustrating light transmission incident from a front end taper portion of the optical sheet bus according to the present invention.

When a light beam is, as shown in FIG. 9B, incident to the optical sheet bus 10 from one optical fiber 20 at the left of the drawing, the light beam travels with the beam cross section expands along the taper surfaces 12b. When the beam reaches the three rear end tapered portions 13, the walls of one of the rear end tapered portions 13 (slant surfaces 13b) reflect a portion of the light beam to divide the light beam into three light beams. The divided light beam is condensed at the end face 13a of the one of the rear end tapered portions 13 and is to be incident to the light guide fiber 20. Thus an amount of the divided light beam is collected by the reflection at the walls of the second taper potion 13, so that an amount of the light incident to the optical fiber 20 becomes greater than that would be derived with non-taper end-optical bus shown in FIGS. 12A to 12C.

According to the present invention, the front and rear end tapered portions 12 and 13 collect light with suppression of leak of light from the surface of the light sheet bus by reflection, so that the light beam is efficiently transmitted therethrough.

The optical sheet bus 10 has the surface roughness not greater than 1.0 μm and the height of the step at the surface thereof not greater than 10 µm. This surely prevents the light from leaking at the surface of the optical sheet bus 10.

Each of the rear end tapered portions 13 has two slant surfaces 13b to have the end face 13a having a diameter which is approximately the same as that of the light guide fiber 10.

As mentioned above, the optical sheet bus 10 as a light guide comprises at least the front end tapered portion (first taper portion) 12 including the end face (optical port) 12a connectable to the optical fiber 20 and the other end 12d, the one end 12a being thinner than the other end 12d; a plurality of the rear end tapered portions 13, each including the end face (optical port) 13a connectable to the optical fiber 20 and the other end 12d (13d), one end face 13a of the rear end tapered portion (second taper) 13 being thinner than the other end 13d of the rear end tapered portion 13; and a main body 11 connected to the other ends 12d and 13d of the front and rear end tapered portions 12 and 13, respectively. The front end tapered portion 12, the main body 11, and the rear end tapered portions 13 may provide traveling of incident light with division between the one end face 12a of the front end tapered portion 12 and the one ends 13a of the rear end tapered portions 13 through dispersion of the incident light as shown in FIG. 9B.

The optical sheet bus 10 comprises a roughness of surfaces thereof which is not greater than 1.0 µm and a height of the step (pin impression) 11a at the surfaces that is not greater than 10 µm.

The optical sheet bus 10 is formed by injection molding with an injection mold 30, wherein the step at the pin impression 11a at the surface is formed by transcription of the surface of the cavity (formed with the shaping recesses 31b and 32b) of the injection mold 30 in which the ejector pin 33a of the ejector mechanism 33 provided to the injection mold 30 slightly protrudes at the surface, the optical sheet bus 10 has a roughness of surfaces thereof which is not greater than 1.0 µm, and the height of the step 11a at the surfaces that is not greater than 10 µm.

Figure 10D:
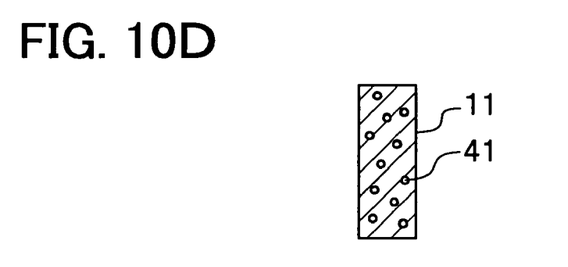
FIG. 10D is a cross section view of the main body according to the embodiment of the present invention.
Figure 10E:
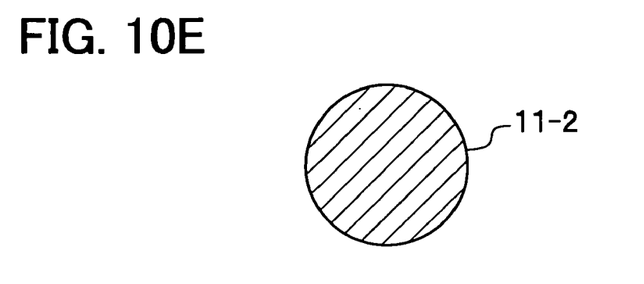
FIG. 10E is a cross section view of the main body according to modification of the present invention.

The main body 11 comprises a configuration selected from the group consisting of the sheet, the rectangular parallelepiped as shown in FIG. 1, and a circular cylinder as shown in FIG. 10E.

Figure 11:
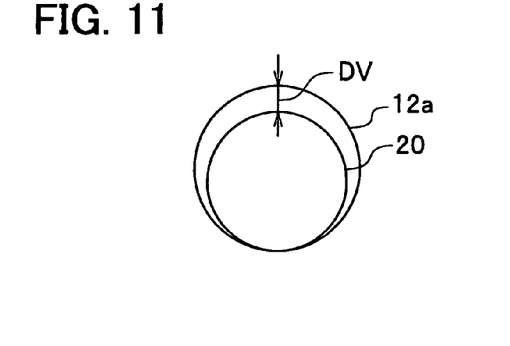
FIG. 11 illustrates a relation between connection surface configurations of the front end taper portion and the optical fiber according to the embodiment of the present invention.

The one end face 12a and 13a included by the front and rear end tapered portions 12 and 13 have connection surface configurations that accord with configurations of cross sections of the optical fibers 20 connectable to the one end faces 12a and 13a included by the front and rear end tapered portions 12 and 13, respectively. FIG. 11 illustrates a relation between connection surface configurations of the front end tapered portion 12 and the optical fiber 20. The relation between the connection surface configuration of the rear end tapered portion 13 and the optical fiber 20 is similar to this. The connection surface configurations (the one end faces 12a and 13a) of the front and rear end tapered portions 12 and 13 have difference in the configurations of the cross sections of the optical fibers 20 connectable to the one ends included by the front and rear end tapered portions 12 and 13, respectively. The difference DV is not greater than 50 µm. More preferably, the difference DV is not greater than 20 µm. Further preferably, the difference DV is not greater than 10 µm.

FIG. 9B illustrates spreading of light incident from the optical fibers 20. The front end tapered portion 12 has the taper angle α which is approximately equal to a spreading angle β of light incident from the optical fiber 20 having a predetermined beam divergence angles into the ends of the front end tapered portion 12. The taper angle α is in a range from 3° to 30°. The rear end tapered portion 13 may have the same structure.

The optical sheet bus 10 comprises the reinforce member 13c connected to neighboring two of the rear end tapered portions 13 as shown in FIGS. 2A and 2C.

FIG. 10D exemplary illustrates a cross section of the main body 11. The main body 11 may include the light-scattering bodies (particles) 41 distributed therein, wherein the light-scattering bodies 41 comprise a substance for scattering light. Thus, the light-scattering bodies 41 are distributed in the PMMA for scattering the incident light. The substance for scattering light has a refractive index which is different from that of PMMA. The substance for scattering light comprises polystyrene. The front and rear end tapered portions 12 and 13 may have the same structure. 17. The substance for scattering light may be bubbles of predetermined gas or the air.

Further, the front and rear end tapered portions 12 and 13, and the main body 11 are arranged in line as shown in FIG. 1. The main body 11 comprises a rectangular parallelepiped including upper and lower parallel planar surfaces, axes of the main body 11, the front and rear (first and the second) taper portions 12 and 13 are arranged on a plane, the front and rear taper portions 12 and 13 comprise upper and lower parallel planar surfaces, and the upper and lower surfaces of the rectangular parallelepiped are connected to the upper and lower parallel planar surfaces of the front and rear taper portions 12 and 13 to provide continuous upper and lower planar surfaces of the light guide body 10, respectively, and the front taper portion 12 includes taper surfaces 12b along the axis of the front taper portion 12 between the upper and lower parallel planar surfaces of the front taper portion 12 having an outwardly convex curvature to make the end face 12a of the front taper portion 12 have the circular surface. The rear taper portion 13 includes taper surfaces 13b along the axis of the rear taper portion 13 between the upper and lower parallel planar surfaces of the rear taper portion 13 having an outwardly convex curvature to make the end face 13a of the rear taper portion 13 have a circular surface.

Modification will be described with reference to FIGS. 10A to 10D which are partial plan views of the front end tapered portion 12 according to modification.

Figure 2D:
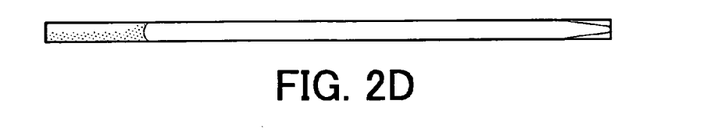

The light guide body 10 has, as shown in FIG. 2D, upper and lower parallel planar surfaces. However, the light guide body 10 may he formed in a circular cylinder of which cross section is shown in FIG. 10E. Then, the light guide body 10 may comprise a truncated cone shape 42 of which cross sections taken on the axes of the front end tapered portion 12 have outlines (generatrix) 12b-1 provided by the surfaces 12b of the front end tapered portion 12 as shown in FIG. 10A. The front end tapered portion 12 comprises a truncated cone shape 42 of which cross sections taken on the axes of the front end tapered portion 12 have outlines (generatrix) 12b-1 provided by the surfaces 12b of the front end tapered portion 12 as shown in FIG. 10A. The outline 12b-1 is selected from a group comprising of a linear outline shown in FIG. 10A, an outwardly curved outline shown in FIG. 10B, and an inwardly curved outline shown in FIG. 10C. The rear end tapered portion 13 may have the same structure. Further, the light guide bodies having such configuration may have the upper and lower parallel planar surfaces thereof.

The invention claimed is:

1. A light guide body comprising:
   at least a first taper portion including one end with a first end face connectable to an optical fiber and the other end, the one end being thinner than the other end;
   a plurality of second taper portions, each including one end with an second end face connectable to an optical fiber and the other end, one end of the second taper portion being thinner than the other end of the second taper portion; and
   a main body connected to the other ends of the first and second taper portions,
   wherein a thickness of the first taper portion is equal to a thickness of the main body in a direction therethrough,
   wherein a thickness of the plurality of second taper portions is equal to the thickness of the main body in the direction therethrough; and
   wherein the first end face is a circle and the first taper portion includes a plurality of types of surfaces between the one end and the other end thereof, a first one of the types is planar surfaces, extending between the one end to the other end thereof, arranged in parallel to each other in a thickness direction perpendicular to the direction, and a second one of the types is curved surfaces, extending from the circle of the first end face to the other end of the first taper portion, arranged in a width direction perpendicular to the direction and the thickness direction.

2. The light guide body as claimed in claim 1, comprising a roughness of surfaces thereof which is not greater than 1.0 μm and a height of a step at the surfaces that is not greater than 10 μm.

3. The light guide body as claimed in claim 1, wherein the main body comprises a rectangular column.

4. The light guide body as claimed in claim 1, wherein the first and second end faces having configurations tat accord with configurations of cross sections of the optical fibers connectable to the first and second taper portions, respectively.

5. The light guide body as claimed in claim 4, wherein the configurations of the first and second end faces comprise difference in the configurations of the cross sections of the optical fibers connectable to the first and second taper portions, respectively, the difference being not greater than 50 μm.

6. The light guide body as claimed in claim 5, wherein the difference is not greater than 20 μm.

7. The light guide body as claimed in claim 6, wherein the difference is not greater than 10 μm.

8. The light guide body as claimed in claim 1, wherein the first and second taper portions comprise truncated cone shapes of which cross sections taken on the axes of the first and second taper portions have outlines provided by the surfaces thereof, respectively, and each of the outlines is selected from the group consisting of a linear outline, an outwardly curved outline, and an inwardly curved outline.

9. The light guide body as claimed in claim 1, wherein the first and second taper portions has taper angles which are approximately equal to a spreading angle of light incident from the optical fibers having a predetermined beam divergence angles into the ends of the first and second taper portions, respectively.

10. The light guide body as claimed in claim 9, wherein the taper angles are in a range from 3° to 30°.

11. The light guide body as claimed in claim 1, being made of Polymethyl methacrylate.

12. The light guide body as claimed in claim 11, wherein the first and second taper portions have taper angles which are approximately equal to a spreading angle of light incident from the optical fibers having a predetermined beam divergence angles into the ends of the first and second taper portions, respectively.

13. The light guide body as claimed in claim 1, wherein the first and second taper portions and the main body is arranged in line.

14. The light guide body as claimed in claim 1, wherein the first taper portion, a plurality of the second taper portions, and the main body have a pair of parallel planar surfaces, respectively, to form a pair of continuous parallel planar surfaces of the light guide body.

15. The light guide body as claimed in claim 1, wherein the first end face is a circle and a diameter of the circle is substantially equal to the thickness.

16. The light guide body as claimed in claim 1, wherein the second end face is a circle and a diameter of the circle is substantially equal to the thickness.

17. The light guide body as claimed in claim 1, wherein a plurality of the second taper portions are arranged only in an arrangement direction perpendicular to the thickness direction.

18. The light guide body as claimed in claim 1, wherein the one end of the first taper portion is thinner than the other end of the first taper portion in another direction perpendicular to the thickness direction.

19. The light guide body according to claim 1, further comprising light-scattering particles distributed in the first taper portion, the plurality of second taper portions and the main body.

20. The light guide body according to claim 1, wherein the first end face has a first dimension in the direction therethrough and a second dimension in a width direction of the first taper portion perpendicular to the direction therethrough, the thickness of the first taper portion equal to the first dimension and smaller than a width of the first taper portion except the first face.

21. The light guide body according to claim 1, wherein the second end face has a dimension in the direction therethrough which is the same as the thickness of the main body irrespective of a number of the second taper portions, and the main body has a dimension in a width direction perpendicular to the direction therethrough which is determined by the number of the second taper portions.

22. The light guide body as claimed in claim 1, wherein the one ends of the first and second taper portions have a circle shape having a diameter which is the same as the thickness of the main body.

23. The light guide body as claimed in claim 1, wherein the plurality of types of surfaces are arranged in perpendicular directions to the direction.

24. The light guide body as claimed in claim 1, wherein the plurality of types of surfaces are arranged along the direction.

25. The light guide body as claimed in claim 1, wherein the main body includes parallel planar side surfaces, the curved surfaces are convex to have ridges extending along the direction, and the planar surfaces extend from the parallel planar side parallel surfaces into the curved surfaces to equalize a width of the other end of the first taper portion to a width of the main body.

26. The light guide body as claimed in claim 25, wherein the planar surfaces have semicircle shapes.

27. The light guide body as claimed in claim 25, wherein the light guide body is produced by molding.

28. The light guide body as claimed in claim 1, wherein the light guide body is produced by molding.

29. A light guide body comprising:
at least a first taper portion including a first end having with a first end face connectable to an optical fiber, and a second end, the first end having a smaller cross sectional area than the second end;
a plurality of second taper portions, each including a first end with an second end face connectable to an optical fiber and a second end, the first end of each of the plurality of second taper portions having a smaller cross sectional area than the second end of each of the plurality of second taper portions;
a main body disposed between the second end of the first taper portion and the second ends of the plurality of second taper portions connected to the other ends of the first and second taper portions;
at least one reinforcing member configured to connect neighboring pairs of the plurality of second taper portions, wherein the at least one reinforcing member comprises a plate-shaped member mounted between two adjacent second taper portions.

30. The light guide body according to claim 29, further comprising light-scattering particles distributed in the first taper portion, the plurality of second taper portions and the main body.

31. A light guide body comprising:
at least a first taper portion including a first end having with a first end face connectable to an optical fiber, and a second end, the first end having a smaller cross sectional area than the second end;
a plurality of second taper portions, each including a first end with a second end face connectable to an optical fiber and a second end, the first end of each of the plurality of second taper portions having a smaller cross sectional area than the second end of each of the plurality of second taper portions;
a main body disposed between the second end of the first taper portion and the second ends of the plurality of second taper portions connected to the other ends of the first and second taper portions; and
light-scattering particles distributed in the first taper portion, the plurality of second taper portions and the main body.

32. The light guide body as claimed in claim 31, wherein the light-scattering particles have a refractive index which is different from that of Polymethyl methacrylate.

33. The light guide body as claimed in claim 31, wherein the light-scattering particles comprise polystyrene.

34. The light guide body as claimed in claim 31, further comprising at least one reinforcing member configured to connect neighboring pairs of the plurality of second taper portions, wherein the at least one reinforcing member comprises a plate-shaped member mounted between two adjacent second taper portions.

35. A light guide body comprising:
at least a first taper portion including one end with a first end face connectable to an optical fiber and the other end, the one end being thinner than the other end;
a plurality of second taper portions, each including one end with an second end face connectable to an optical fiber and the other end, one end of the second taper portion being thinner than the other end of the second taper portion in a width direction; and
a main body connected to the other ends of the first and second taper portions, wherein the main body comprises a rectangular parallelepiped including upper and lower parallel planar surfaces, axes of the main body, the first taper portion, and the plurality of second taper portions are arranged on a plane in another direction perpendicular to the width direction, the first taper portion and the plurality of second taper portions comprise upper and lower parallel planar surfaces, and the upper and lower surfaces of the rectangular parallelepiped are connected to the upper and lower parallel planar surfaces of the first and second taper portions to provide continuous upper and lower planar parallel surfaces of the light guide body, respectively, and the first taper portion includes taper surfaces along the axis of the first taper portion between the upper and lower parallel planar surfaces of the first taper portion having an outwardly convex curvature to make the first end face have a circular surface; and
light-scattering particles distributed in the first taper portion, the plurality of second taper portions and the main body.

36. A light guide body comprising:
at least a first taper portion including one end with a first end face connectable to an optical fiber and the other end, the one end being thinner than the other end;
a plurality of second taper portions, each including one end with an second end face connectable to an optical fiber and the other end, one end of the second taper portion being thinner than the other end of the second taper portion; and
a main body connected to the other ends of the first and second taper portions,
wherein a thickness of the first taper portion is equal to a thickness of the main body in a direction therethrough,
wherein a thickness of the plurality of second taper portions is equal to the thickness of the main body in the direction therethrough, and
wherein the first end face is a circle and the first taper portion includes tapered surfaces, each including a plurality of types of surfaces arranged in the direction, wherein a first one of the types is planar surfaces extending from the other end in parallel to each other and a second one of the types is curved surfaces extending from the circle of the first end face to the other end of the first taper portion.

37. An optical sheet bus system comprising:
an input optical fiber, a plurality of output optical fibers, and a light guide body which comprises:
at least a first taper portion including one end connected to the input optical fiber and the other end, the one end being thinner than the other end;
a plurality of second taper portions, each including one end with a second end face connected to each of the output optical fibers and the other end, one end of the second taper portion being thinner than the other end of the second taper portion; and
a main body connected to the other ends of the first and second taper portions;
wherein a thickness of the first taper portion is equal to a thickness of the main body in a direction therethrough,
wherein a thickness of the plurality of second taper portions is equal to the thickness of the main body in the direction therethrough,
wherein the one ends of the first and second taper portions have a circle shape having a diameter which is the same as the thickness of the main body; and wherein the light guide body delivers a light signal from the input optical fiber to the output optical fibers;

wherein the first end face is a circle and the first taper portion includes a plurality of types of surfaces between the one end and the other end thereof, a first one of the types is planar surfaces, extending between the one end to the other end thereof, arranged in parallel to each other in a thickness direction perpendicular to the direction, and a second one of the types is curved surfaces, extending from the circle of the first end face to the other end of the first taper portion, arranged in a width direction perpendicular to the direction and the thickness direction.

38. The optical sheet bus system as claimed in claim 37, wherein the light guide body is producing by molding.

* * * * *